(12) United States Patent
Shoge (10) Patent No.: US 6,640,938 B2
(45) Date of Patent: Nov. 4, 2003

(54) SHIFT ASSIST APPARATUS FOR A BICYCLE (75) Inventor: Akihiko Shoge, Shimonoseki (JP)

(73) Assignee: Shimano, Inc., Osaka (JP)

( * ) Notice: Subject to any disclaimer, the term of this patent is extended or adjusted under 35 U.S.C. 154(b) by 40 days.

(21) Appl. No.: 10/100,756

(22) Filed: Mar. 18, 2002

(65) Prior Publication Data

US 2002/0134625 A1 Sep. 26, 2002

(30) Foreign Application Priority Data

Mar. 22, 2001 (JP) .................................. 2001-083067

(51) Int. Cl.⁷ .............................. B62L 1/00; B62L 3/00
(52) U.S. Cl. ..................... 188/24.11; 474/80
(58) Field of Search ...................... 474/78, 80, 82; 188/24.14, 24.15, 24.11, 24.22, 26; 280/260, 261; 74/567, 500.5

(56) References Cited

U.S. PATENT DOCUMENTS

| 5,535,855 A | 7/1996 | Hanada | 188/24.14 |
|---|---|---|---|
| 5,816,599 A | 10/1998 | Soejima et al. | 280/259 |
| 6,042,495 A | * 3/2000 | Patterson et al. | 474/80 |
| 6,048,287 A | * 4/2000 | Rohloff | 475/297 |
| 6,258,005 B1 | * 7/2001 | Rohloff | 475/277 |
| 6,325,733 B1 | * 12/2001 | Patterson et al. | 474/80 |
| 6,443,032 B1 | * 9/2002 | Fujii et al. | 74/567 |
| 6,478,711 B2 | * 11/2002 | Yoo | 475/289 |
| 6,572,508 B2 | * 6/2003 | Shoge | 475/324 |

FOREIGN PATENT DOCUMENTS

| EP | 1112923 | * 7/2001 |
|---|---|---|
| EP | 1243501 | * 3/2002 |

* cited by examiner

*Primary Examiner*—Christopher P. Schwartz
*Assistant Examiner*—Deion Kramer
(74) *Attorney, Agent, or Firm*—James A. Deland (57) ABSTRACT

A control apparatus for controlling a drive member rotatably supported on a bicycle includes a mounting member for mounting the apparatus to the bicycle, a braking mechanism coupled to the mounting member for applying a braking force to the drive member; and a coupling mechanism adapted to couple the braking mechanism to a shift control mechanism so that the braking mechanism applies the braking force to the drive member upon actuation of the shift control mechanism.

35 Claims, 7 Drawing Sheets

SHIFT ASSIST APPARATUS FOR A BICYCLE

BACKGROUND OF THE INVENTION

The present invention is directed to control devices for bicycle transmissions and, more particularly, to an apparatus that facilitates the gear shifting operation for the transmission.

Bicycle transmissions known in the art include internal transmissions housed within the rear hub and external transmissions mounted on the rear hub around the crank spindle. Internal transmissions typically employ a planetary gear device and a clutch for selecting different power transmission paths through the planetary gear device. Such transmissions include the pushrod type and the rotary cam type. The pushrod type internal transmission comprises a pushrod slidingly mounted in the axial direction through the center of the hub spindle for moving the clutch axially to select the plurality of power transmission paths through the planetary gear device. A rotary cam type internal transmission includes a cam shaft with a plurality of cams arrayed in the axial direction, wherein the cam shaft is mounted for rotation around the hub spindle between the sun gears of the planetary gear device and the hub spindle. The rotational position of the cam shaft determines which sun gears are nonrotatably fixed to the hub spindle and which sun gears are free to rotate around the hub spindle. This, in turn, determines the power transmission path through the planetary gear device. External transmissions typically comprise a plurality of coaxially arranged sprockets that rotate with the pedals and/or the rear wheel and a corresponding front and/or rear derailleur for shifting a chain among the corresponding plurality of sprockets as the bicycle is being pedaled.

In both types of transmissions, a shift control device attached to the handlebar, for example, is coupled to the transmission by means of a control cable having an inner wire that slides within an outer casing. Operating the shift control device in one direction causes displacement of the inner wire towards the shift control device, while moving the shift control device in the another direction causes displacement of the inner wire towards the transmission by means of a return spring provided to the shift control device or to the transmission.

With an internal transmission, pedaling the bicycle causes substantial contact forces to be generated among the components that make up the planetary gear device. Thus, unless essentially no power is being transmitted to the rear wheel, such as when the rider stops pedaling or when the pedals are situated at the top or bottom deadpoint, the shifting operation will require the application of considerable force to the pushrod or cam shaft. When the shifting operation includes displacement of the inner wire towards the transmission by means of the return spring provided to the shift control device or to the transmission, very often the return spring is incapable of providing the required force until the pedals are situated at the top or bottom deadpoint or until the rider stops pedaling.

With an external transmission, the bicycle must be pedaled in order to shift the transmission. Thus, optimum shifting occurs either when the pedals are situated at the top or bottom deadpoint or when the rider consciously reduces the pedaling force.

SUMMARY OF THE INVENTION

The present invention is directed to a shift assist apparatus which helps to reduce the force applied to the transmission when a shifting operation is desired. In one embodiment of the present invention, a control apparatus for controlling a drive member rotatably supported on a bicycle includes a mounting member for mounting the apparatus to the bicycle, a braking mechanism coupled to the mounting member for applying a braking force to the drive member; and a coupling mechanism adapted to couple the braking mechanism to a shift control mechanism so that the braking mechanism applies the braking force to the drive member upon actuation of the shift control mechanism.

In a specific embodiment of the present invention, the apparatus includes a mounting member for mounting the apparatus to the bicycle; a rotary member rotatably supported to the mounting member; a first braking member; a first cam member coupled to the mounting member; a second cam member coupled to the rotary member for rotation therewith; wherein at least one of the first cam member and the second cam member moves the first braking member when the first cam member and the second cam member rotate relative to each other; a coupling pawl coupled to the rotary member; a pawl biasing member for biasing the coupling pawl toward a coupled position for coupling the rotary member for rotation with the drive member; and a pawl control member for retaining the coupling pawl in a decoupled position. In this embodiment, the pawl control member is adapted to couple to a shift control mechanism so that the coupling pawl is allowed to move toward the coupled position upon actuation of the shift control mechanism.

DETAILED DESCRIPTION OF THE EMBODIMENTS

Figure 1:
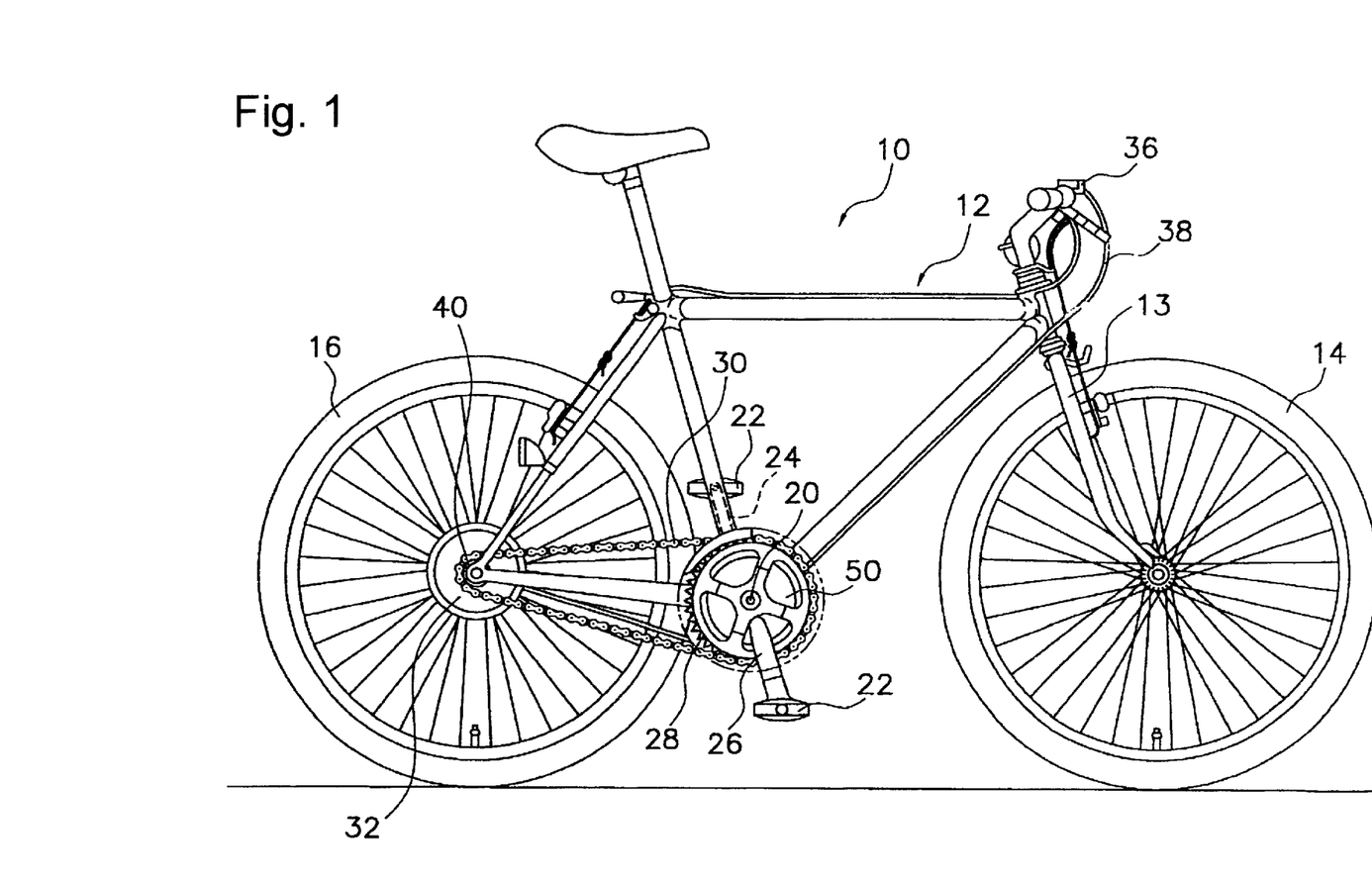
FIG. 1 is a side view of a bicycle that includes a particular embodiment of a shift assist apparatus according to the present invention.
Figure 3:
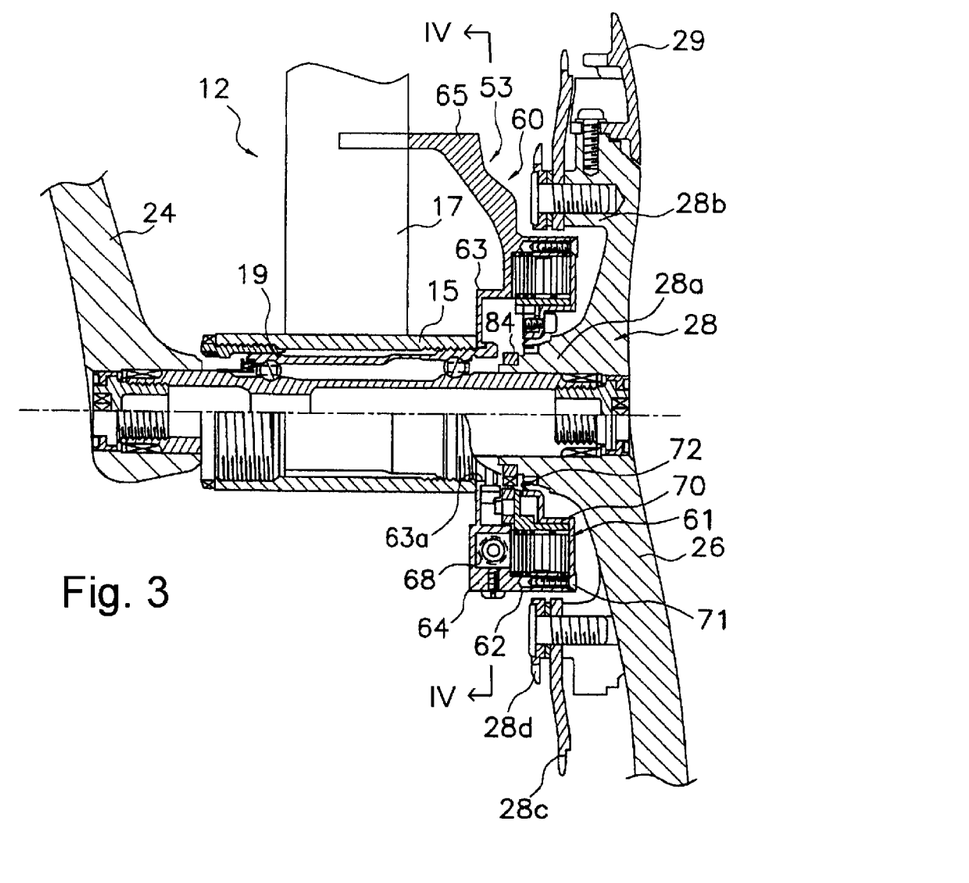
FIG. 3 is a partial cross sectional view of the shift assist apparatus mounted to the bottom bracket assembly.
Figure 4:
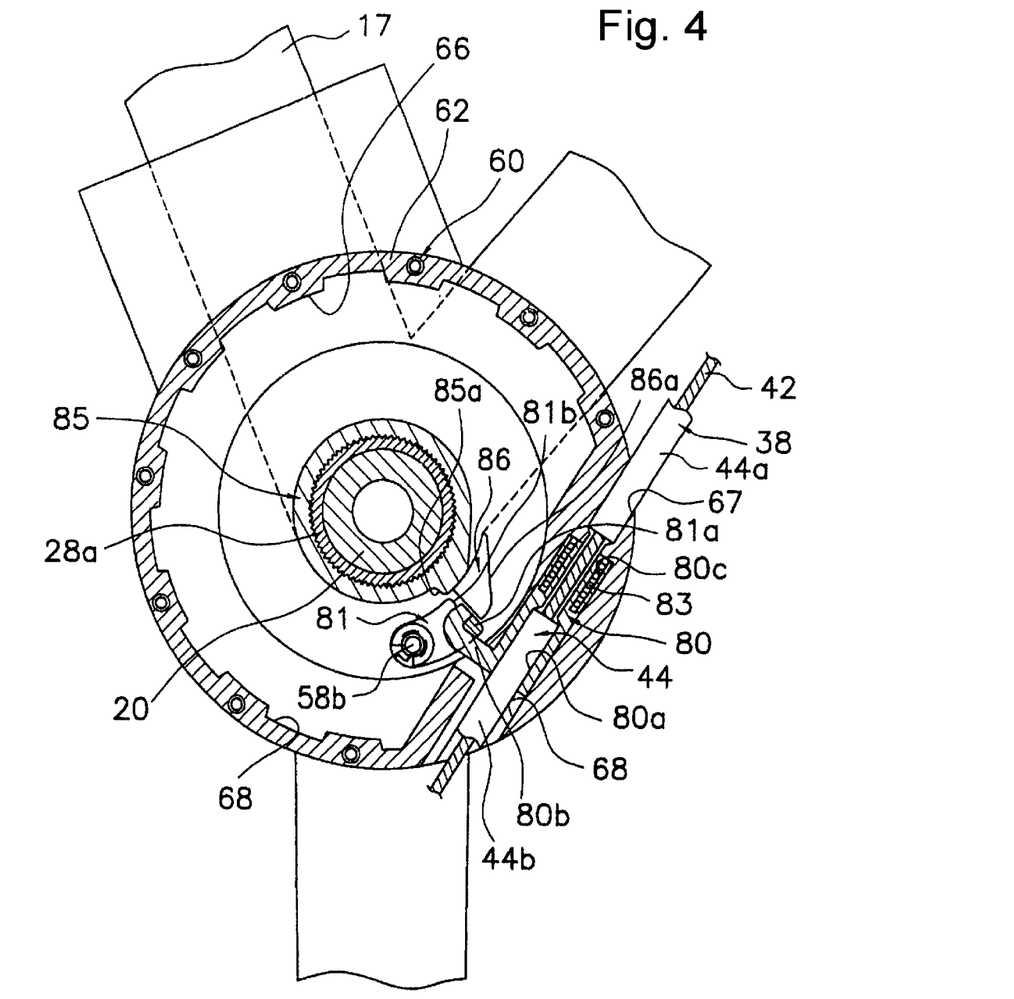
FIG. 4 is a view taken along line IV—IV in FIG. 3.

FIG. 1 is a side view of a bicycle 10 that includes a particular embodiment of a shift assist apparatus 50 according to the present invention. Bicycle 10 includes a frame 12 having a front fork 13; a front wheel 14 mounted on the front fork 13; and a rear wheel 16 mounted on the rear of the frame 12. As shown in FIG. 3, a crank spindle 20 is rotatably supported in a bottom bracket 19 threadably fastened to the hanger portion 15 of the frame 12. The two ends of the crank spindle 20 have nonrotatably mounted thereon a pair of left and right crank arms 24 and 26, each having a pedal 22 mounted to its distal end.

The crank arm 26 on the right side (as viewed from the back) is assembled with a front sprocket portion 28 having two (a large and a small) sprocket plates 28c, 28d mounted thereon, a centrally disposed boss portion 28a for nonrotatable mounting to the crank spindle 20, and an outer peripheral sprocket mounting portion 28b. A sprocket cover 29 is mounted on the outside peripheral portion of the front sprocket portion 28, and a chain 30 may be engaged around either of the sprocket plates 28c, 28d.

An internally geared hub 32 is mounted on the rear wheel 16. The internally geared hub 32 is coupled by means of a control cable 38 to a shift control device 36 attached to the handlebar 34. The internally geared hub 32 may be, for example, a four-speed rotary cam type hub having a rear sprocket 40 non-rotatably coupled to the right side thereof. The chain 30 is engaged around the rear sprocket 40 so that rotational force of the crank arms 24 and 26 is transmitted to the internally geared hub 32.

Figure 2:
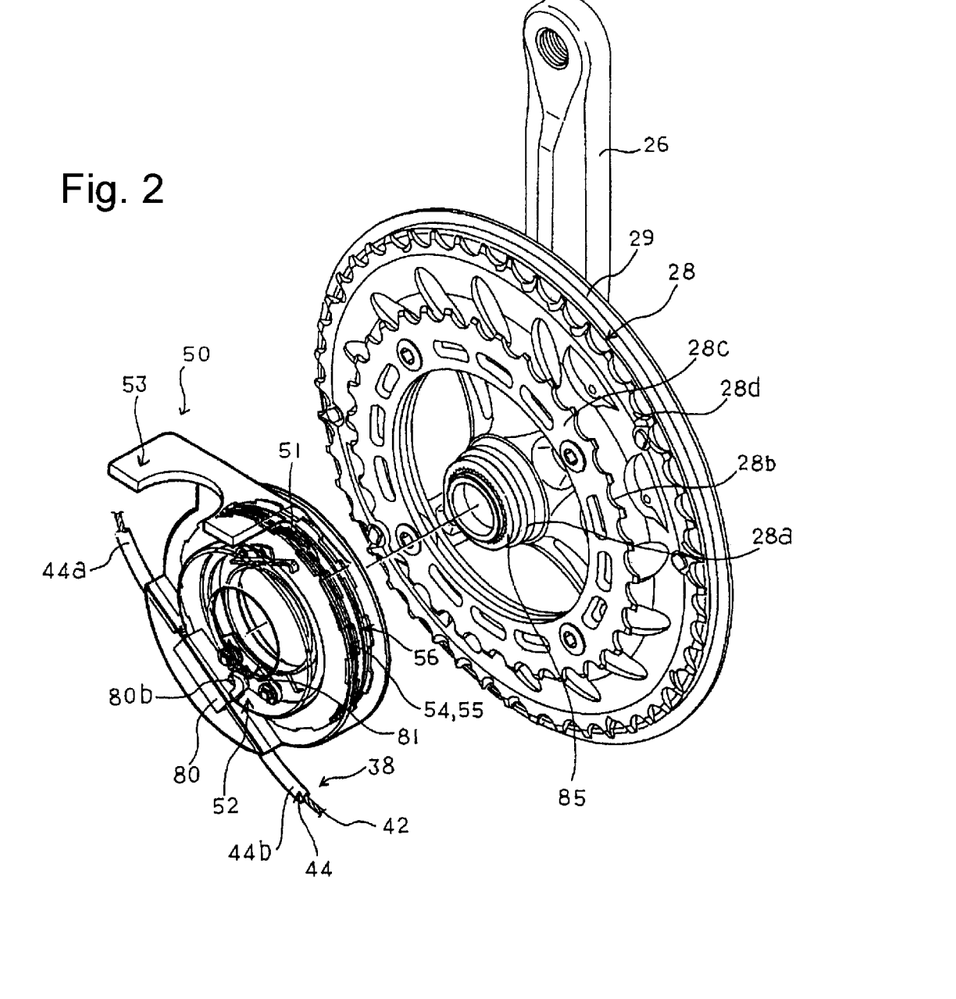
FIG. 2 is a perspective view of the shift assist apparatus disassembled from the front sprocket assembly.

As shown in FIG. 2, the control cable 38 comprises an inner wire 42 coupling the operating member of the shift control device 36 to the operating member of the internally geared hub 32, and an outer casing 44 covering the inner wire 42. The outer casing 44 is disposed on the outside of the inner wire 42 so as to be capable of relative motion with respect to the inner wire 42. The outer casing 44 is divided into a first casing 44a that extends from shift control device 36 to the shift assist apparatus 50, and a second casing 44b that extends from the shift assist apparatus 50 to the internally geared hub 32. The two ends of the first casing 44a are immoveable with respect to the frame 12, and the internally geared hub 32 end of the second casing 44b is immoveable with respect to the frame 12. The shift assist apparatus 50 end of the second casing 44b is retained to a translating member 80 and can move along with it as described below.

As shown in FIGS. 2 to 5, in this embodiment shift assist apparatus 50 is arranged around the crank spindle 20 between the front sprocket portion 28 and the frame 12, and it is provided for the purpose of braking the crank spindle 20 during shift operations to lower the tension on the chain 30. This, in turn, decreases the contact forces created within hub 32 to facilitate the shifting operation. To that end, the shift assist apparatus 50 comprises a braking mechanism 51 mounted to the frame 12 and a coupling mechanism 52 for coupling and decoupling the braking mechanism 51 for rotation with crank spindle 20. The braking mechanism 51 comprises a bracket 53 nonrotatably mounted on the frame 12 about the crank spindle 20; a fixed portion 54 including a plurality of first friction disks 57 nonrotatably mounted on bracket 53, each having a first friction face 57a; a rotary portion 55 including a plurality of second friction disks 59 nonrotatably mounted to a rotary member 58, each having a second friction face 59a; and a braking force regulating portion 56 for varying braking force during the course of a single rotation of the crank spindle 20.

Bracket 53 is attached to hanger portion 15 by means of the bottom bracket 19. Bracket 53 comprises a bracket body 60 having a round opening and a cover member 61 for covering the opening. The bracket body 60 comprises a first cylindrical portion 62 having the form of a bottomed hollow cylinder, an attachment cylinder 63 having the form of a bottomed hollow cylinder of smaller diameter than a first cylindrical portion 62, a guide portion 64 formed on the back face of first cylindrical portion 62, and a frame detent portion 65 extending radially outwardly from the outer peripheral face of the first cylindrical portion 62. Frame detent portion 65 bends so as to extend parallel to the crank spindle 20, and a semicircular recess 65a formed at the distal end of frame detent portion 65 engages the seat tube 17 to ensure that bracket 53 is nonrotatably fixed to frame 1.

First splines 66 for nonrotatably supporting the first friction disks 57 of the braking mechanism 51 are circumferentially formed on the inside peripheral surface of the first cylindrical portion 62. The fixed portion 54, rotary portion 55 and braking force regulating portion 56 are accommodated within the first cylindrical portion 62. The attachment cylinder 63 projects slightly outward from the back face of the first cylindrical portion 62, and it is fastened to hanger portion 15 by the flanged portion of bottom bracket 19 that extends through its center hole 63a. The guide portion 64 is disposed at a radially outward portion of first cylindrical portion 62, and in this embodiment it has the shape of a partial circular arc intersecting a chord. The inner wire 42 of control cable 38 extends through the guide portion 64. An outer detent portion 67 for supporting one end of the first casing 44a is formed at the shift control device 36 end of guide portion 64. On the hub 32 side of guide portion 64 is formed a guide hole 68 of rectangular cross section for slidingly guiding a translating member 80 of the coupling mechanism 52 in the direction of cable passage.

The cover member 61 is a tubular flange member having at its center a second cylindrical portion 70 of smaller diameter than the first cylindrical portion 62. The cover member 61 is detachably fastened to the end face of the first cylindrical portion 62 by means of a plurality of bolts 71. A sealing member 72 is installed between the inner rim of the cover member 61 and the boss portion 28a of the front sprocket portion 28 to prevent water or foreign matter from entering.

The fixed portion 54 comprises, for example, three first friction disks 57. First friction faces 57a are formed on the two sides of each first friction disk 57, and splines 57b are formed on the outer peripheral edges thereof for nonrotatably mating with splines 66 of the first cylindrical portion 62. The rotary portion 55 comprises a cylindrical rotary member 58 rotatably mounted on the outside peripheral face of the second cylindrical portion 70 of cover member 70 and, for example, three second friction disks 59 disposed in alternating arrangement with the first friction disks 57. Second splines 58a are formed on the outer peripheral surface of the rotary member 58. Second friction faces 59a are formed on the two sides of each second friction disk 59, and splines 59b are formed on the inner peripheral edges of each second friction disk 59 for nonrotatably mating with the splines 58a on rotary member 58.

Figure 6:
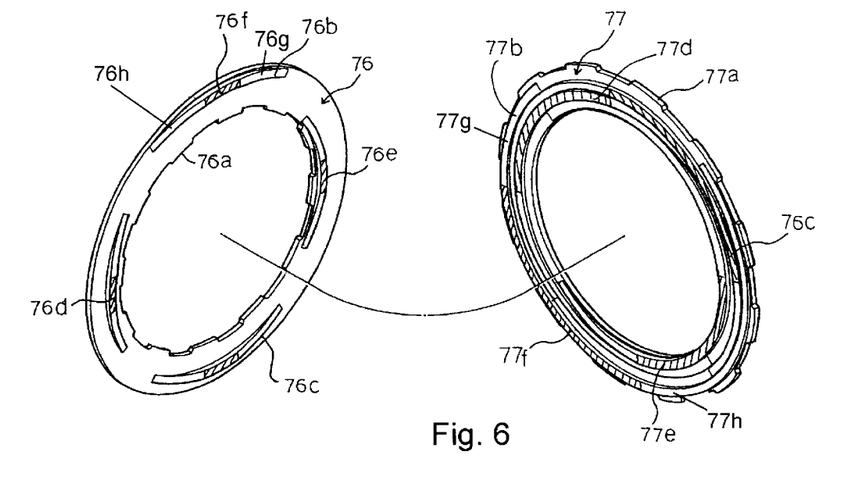
FIG. 6 is a perspective view of a particular embodiment of the first and second cam disks used in the shift apparatus.

The braking force regulating portion 56 comprises a rotary cam mechanism 75 arranged coaxially with the friction disks 57 and 59 for varying the pressing force exerted on friction disks 57 and 59 in response to rotation of the rotary member 58. The rotary cam mechanism 75 comprises a first cam disk 76, a second cam disk 77 adjacent to first cam disk 76, and a corrugated plate spring 78 for biasing the first and second cam disks 76 and 77 together. As shown in FIG. 6, splines 76a are formed on the inner peripheral surface of first cam disk 76 for nonrotatably mating with the splines 58a formed on the outer peripheral surface of rotating member 58, and four first cam projections 76b, 76c, 76d, 76e facing second cam disk 77 extend circumferentially around first cam disk 76. Each cam projection 76b–76e includes a first ramp 76g extending in the axial direction toward the second cam disk 77, a transition portion 76f (indicated by hatching in FIG. 6) extending from the first ramp 76g in a circumferential direction, and a second ramp 76h extending from the transition portion 76f away from the second cam disk 77. The four first cam projections 76b–76e are arranged such that their transition portions 76f are situated at different locations 90° apart in the circumferential direction.

Splines 76a are formed on the outer peripheral surface of second cam disk 77 for nonrotatably mating with splines 66 formed on the inner peripheral surface of first cylindrical portion 62, and four second cam projections 77b, 77c, 77d, 77e facing first cam disk 76 extend circumferentially around second cam disk 77. In this embodiment, the second cam projections 77b–77e have greater circumferential extension than do the first cam projections 76b–76e. Each cam projection 77b–77e includes a first ramp 77g extending in the axial direction toward the first cam disk 76, a transition portion 77f (indicated by hatching in FIG. 6) extending from the first ramp 77g in a circumferential direction, and a second ramp 77h extending from the transition portion 77f away from the first cam disk 76. The four second cam projections 77b–77e are arranged such that their transistion portions 77f are situated at different locations 90° apart in the circumferential direction.

The second cam disk 77, through relative motion with respect to the first cam disk 76, can move axially with respect to the first cam disk 76 in the direction of the crank spindle 20 so as to press together the two sets of friction disks 57 and 59. A guide member 79 is attached to the inside side wall of cover member 61 so that the two cam disks 76, 77 are smoothly displaceable in the axial direction. By arranging the two sets of cam projections 76b and 76e and 77b–77e in this way, the two sets of cam projections 76b–76e and 77b–77e are constantly in contact and resist tilting even when undergoing relative motion.

Figure 5:
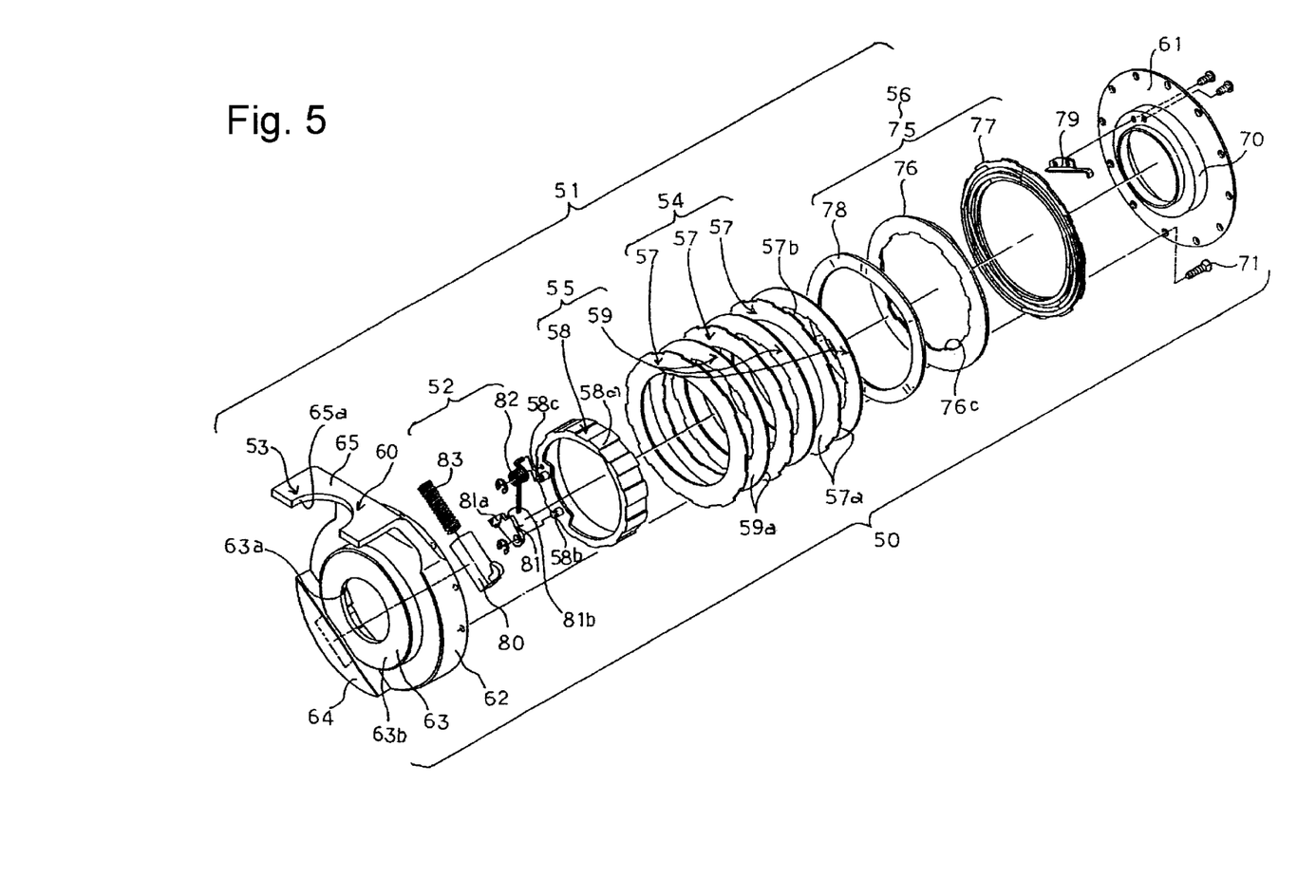
FIG. 5 is an exploded view of the shift assist apparatus.

The rotary member 58 is selectively coupled for rotation with crank spindle 20 by means of the coupling mechanism 52. As shown in FIG. 5, a pawl shaft 58b projects from the side of the rotary member 58 for rotatably supporting a coupling pawl 81, and a spring post 58c projects from the side of the rotary member 58 for mounting a helical torsion spring 82 that biases the coupling pawl 81 radially inwardly. The translating member 80 has a rectangular rod configuration, and it is slidingly supported within guide hole 68. A catch projection 80b is formed at the first end of translating member 80. The distal end of catch projection 80b is bent into a hook for engaging a hook-shaped catch projection 81a of coupling pawl 81 for holding coupling pawl 81 in a decoupled position shown in FIG. 4. A detent portion 80a is formed at a first end of translating member 80 for terminating an end of the second casing 44b.

A catch ring 85 forming an abutment 85a is attached to and rotates with boss portion 28a of front sprocket portion 28 of crank arm 26. The catch ring 85 is nonrotatably fixed to boss portion 28a by suitable fixing means such as interlocking serrations or by some other means. As described below, translation member 80 translates within guide hole 68 between a pawl engaging position and a pawl disengaging position. In the pawl disengaging position, depicted in FIG. 4, catch projection 80b engages catch projection 81a of coupling pawl 81 to thereby hold coupling pawl 81 in a decoupled position. In the pawl disengaging position, further towards the lower left in FIG. 4, the coupling pawl 81 pawl is allowed to move radially inwardly toward a coupled position, wherein a catch recess 81b of coupling pawl 81 abuts against abutment 85a formed on catch ring 85. In the coupled position, coupling pawl 81 and thereby rotary member 58 rotate together with catch ring 85. A return projection 86 is formed on the interior side wall of bracket 53. The return projection 86 has a sloping face 86a for contacting the catch hook 81a of the coupling pawl 81 to return the coupling pawl 81 to the decoupled position.

An annular recess 80c is formed at a second end of translating member 80 for supporting a coil spring 83 that biases the translating member 80 towards the pawl disengaging position. The translating member 80 is normally situated at the pawl engaging position because of the pressing force of the second casing 44b, but during a shift operation the inner wire 42 undergoes displacement towards hub 32 so that the pressing force of the second casing 44b is diminished, whereupon the translating member 80 moves to the pawl disengaging position because of the biasing force of the coil spring 83. When the shift operation is complete, translating member 80 returns to the pawl engaging position because of the pressing force of the second casing 44b.

Assembly of shift assist apparatus 50 is as follows. Translating member 80 is first arranged at the bottom of the guide hole 68 and temporarily secured at this location by means of a fastening bolt 90 depicted in FIG. 3. While pushing towards the shift control device 36, the attachment cylinder 63 of the bracket 53 is attached to the bottom bracket 19, and the bottom bracket 19 is threaded into the hanger portion 15. At this time, the frame detent portion 65 is fixed to the seat tube 17 so that bracket 53 is nonrotatably mounted on the frame 12 about the crank spindle 20.

The control cable 38 is then installed in the shift assist apparatus 50. More specifically, a first end of the inner wire 42 (sheathed by the first casing 44a) is attached to the shift control device 36, while a second end of inner wire is passed through translating member 80 such that the first casing 44a is terminated in the outer detent portion 67 of the guide portion 64. The second casing 44b is then slipped onto the inner wire 42, the inner wire 42 is secured to the operating member of the internally geared hub 32, and the second casing 44b is terminated in the outer detent portion 80a of the translating member 80. The operating member of the internally geared hub 32 is adjusted appropriately. A check is then performed to verify that the catch projection 80b of translating member 80 properly mates with the catch projection 81a of the coupling pawl 81.

Finally, the left and right crank arms 24 and 26 are arranged on both ends of the crank spindle 20, and the chain 30 is installed on one of the sprocket plates 28c and 28d. The temporary fastening bolt 90 is then removed, thus allowing the translating member 80 to undergo translating motion. A check is then performed to verify that the shift assist apparatus 50 operates normally when a shift operation is performed in the loaded state.

Operation of the shift assist apparatus 50 during shift operations is as follows. When the inner wire 42 is pulled towards the shift control device 36 such as occurs, for example, when shift control device 36 is operated to shift the internally geared hub 32 from a lower speed to a higher speed, the second casing 44b maintains a pressing force on the translating member 80 so that the translating member 80 of the shift assist apparatus 50 is maintained in the engaged position. However, when shift control device 36 is operated such that the inner wire 42 is returned towards the internally geared hub 32 to shift the internally geared hub 32 from a higher speed to a lower speed speed, the pressing force of the second casing 44b on the translating member 80 drops to a low level due to displacement of the inner wire 42 towards the internally geared hub 32. As a result, the translating member 80 of the shift assist apparatus 50 moves to the left in FIG. 4 from the engaged position to the disengaged position. When translating member 80 moves to the disengaged position, the coupling pawl 81 becomes disengaged from the translating member 80, and coupling pawl 81 moves radially inwardly from the decoupled position to the coupled position. In this position, the catch recess 81b of coupling pawl 81 engages the coupling projection 85a of the catch ring 85, whereupon the rotary member 58, second friction disks 59 and first cam disk 76 rotate together with the crank spindle 20.

Figures 7A, 7B, 7C:
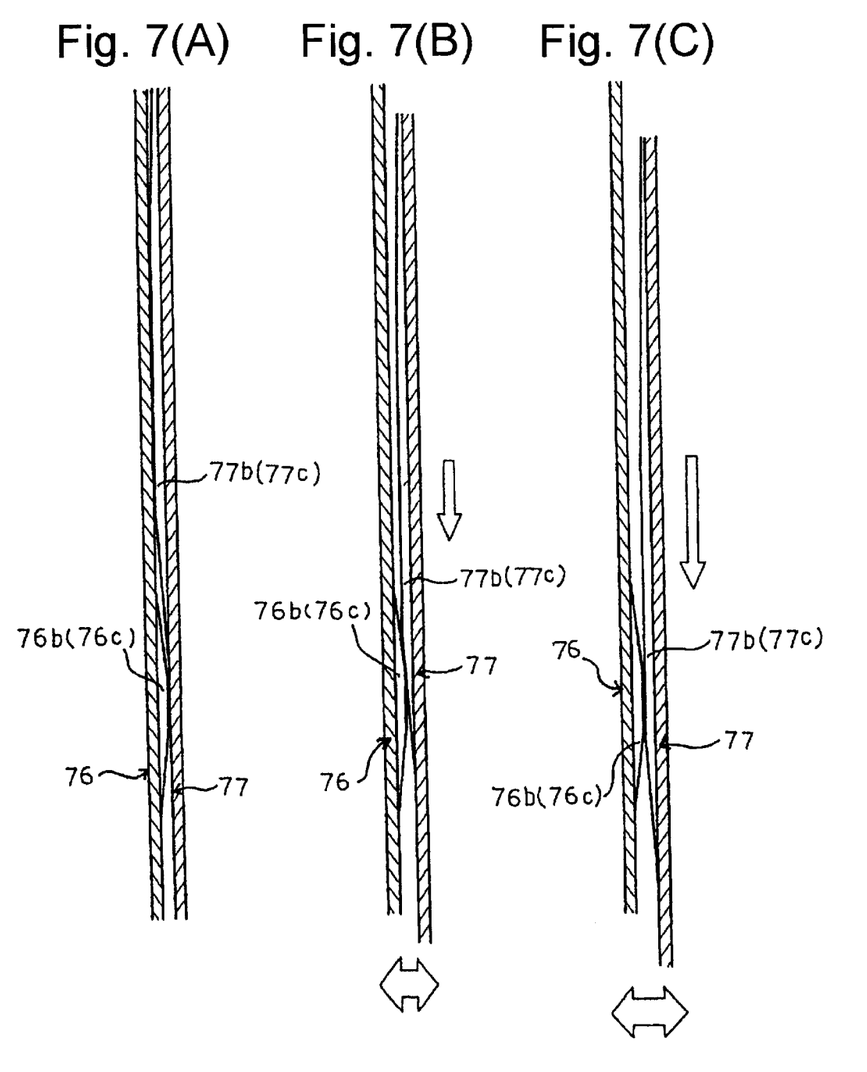
FIGS. 7(A)–7(C) are diagrams illustrating the operation of the first and second cam disks.

FIGS. 7(A)–7(C) are diagrams illustrating the operation of the first and second cam disks 76 and 77. During the first half of the rotation, the transition portions 76f, 77f of first and second cam disks 76 and 77 gradually overlap so that the first and second cam disks 76 and 77 move axially away from each other. This creates a progressively increasing pressing force on the first and second friction disks 57 and 59 which, in turn, creates a progressively increasing braking force on rotary member 58 and crank spindle 20. This results in less tension being applied to chain 30 and hub 32, thereby facilitating the shifting operation by reducing contact forces in the planetary gear mechanism within hub 32. The gradual increase in braking force reduces the chance that the rider will experience any discomfort.

When the transition portions 76f and 77f subsequently pass each other, the first and second cam disks 76 and 77 move progressively closer together because of the biasing force of the corrugated plate spring 78. The pressing force on the first and second friction disks 57 and 59 diminish accordingly so that the braking force on crank spindle 20 gradually decreases. When the crank spindle 20 has undergone one rotation and the coupling pawl 81 rides up over the return projection 86, the coupling pawl 81 is returned to the decoupled position and held in the decoupled position by the engagement of catch projection 80b of translating member 80, which has now returned to the engaged position under the pressing force of the second casing 44b, and catch projection 81a of coupling pawl 81. At this time, braking of the crank spindle 20 is completely released.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa.

Whereas in the described embodiment the front sprocket portion 28 is the drive apparatus that is braked, a different drive apparatus could be braked. For example, the rear sprocket 40 could be braked rather than the front sprocket portion 28. The braking mechanism 51 and the crank spindle 20 may be directly linked. The braking mechanism 51 may be situated at the left in FIG. 3, with the braking mechanism 51 coupled with the left end of the crank spindle 20. Instead of the braking mechanism 51 being fastened to the frame 12, the braking mechanism could instead be fastened to the crank spindle 20 to effect coupling/decoupling with the frame 12.

In the described embodiment the coupling member coupling the shift control device to the internal gearshift was a control cable, but the coupling member could instead be a metal rod, hydraulic/pneumatic system, etc. While the braking mechanism was illustrated as multiple friction disks, the braking mechanism could instead employ a different braking structure including a drum or a caliper. Of course, the invention may also be implemented in an external gearshift apparatus comprising a derailleur and a plurality of sprockets.

It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A control apparatus for controlling a drive member rotatably supported on a bicycle comprising:
   a mounting member for mounting the apparatus to the bicycle;
   a braking mechanism coupled to the mounting member for applying a braking force to the drive member; and
   a coupling mechanism adapted to couple the braking mechanism to a shift control mechanism so that the braking mechanism applies the braking force to the drive member upon actuation of the shift control mechanism.

2. The apparatus according to claim 1 further comprising a cam mechanism that causes the braking mechanism to vary the braking force on the drive member in response to rotation of the drive member.

3. The apparatus according to claim 1 wherein the shift control mechanism is operated by a control cable having an inner wire disposed within an outer casing, and wherein the coupling mechanism comprises an outer casing coupler for coupling to the outer casing of the control cable.

4. The apparatus according to claim 1 wherein the shift control mechanism is operated by a control cable having an inner wire disposed within an outer casing, wherein the coupling mechanism comprises a first outer casing coupler for terminating a first portion of the outer casing of the control cable, and wherein the mounting member comprises a second outer casing coupler for terminating a second portion of the outer casing of the control cable.

5. The apparatus according to claim 1 wherein the braking mechanism comprises:
   a first braking member coupled to the mounting member;
   a second braking member; and
   a drive coupling mechanism adapted to selectively couple the second braking member for rotation with the drive member.

6. The apparatus according to claim 5 wherein the braking mechanism further comprises:
   a first cam member coupled to the mounting member;
   a second cam member;
   wherein the drive coupling mechanism is adapted to selectively couple the second cam member for rotation with the drive member; and
   wherein at least one of the first cam member and the second cam member causes at least one of the first braking member and the second braking member to apply the braking force to the drive member.

7. The apparatus according to claim 6 wherein the drive coupling mechanism comprises:
   a rotary member;
   a coupling member for selectively coupling the rotary member for rotation with the drive member; and
   wherein the second braking member and the second cam member are coupled to the rotary member.

8. The apparatus according to claim 7 wherein the first cam member includes a first cam surface, wherein the second cam member includes a second cam surface, wherein the first cam surface engages the second cam surface when the first cam member and the second cam member rotate relative to each other for moving the first cam member relative to the second cam member to cause the at least one of the first braking member and the second braking member to apply the braking force to the drive member.

9. The apparatus according to claim 8 wherein the first cam surface and the second cam surface cause the first cam member and the second cam member to move axially relative to each other when the first cam member and the second cam member rotate relative to each other.

10. The apparatus according to claim 9 wherein at least one of the first cam member and the second cam member causes the first braking member and the second braking member to frictionally contact each other when the first cam member and the second cam member rotate relative to each other.

11. The apparatus according to claim 9 wherein the first cam surface and the second cam surface are structured for causing the first cam member and the second cam member to reciprocate relative to each other in the axial direction when the first cam member and the second cam member rotate relative to each other.

12. The apparatus according to claim 11 wherein the first cam surface and the second cam surface are structured for causing the first cam member and the second cam member to reciprocate relative to each other in the axial direction only once for each revolution of the first cam member relative to the second cam member.

13. The apparatus according to claim 9 wherein the first cam member includes a plurality of the first cam surfaces disposed in a circumferential direction, and wherein the second cam member includes a plurality of the second cam surfaces disposed in a circumferential direction.

14. The apparatus according to claim 13 wherein each of the plurality of first cam surfaces includes a first ramp extending in the axial direction toward the second cam member, a transition portion extending from the first ramp in a circumferential direction, and a second ramp extending from the transition portion away from the second cam member, and wherein each of the plurality of second cam surfaces includes a first ramp extending in the axial direction toward the first cam member, a transition portion extending from the first ramp in a circumferential direction, and a second ramp extending from the transition portion away from the first cam member.

15. The apparatus according to claim 14 wherein the plurality of first cam surfaces and the plurality of second cam surfaces are aligned such that, upon rotation of the first cam member and the second cam member relative to each other, the first ramp of each first cam surface engages the first ramp of a corresponding second cam surface, the transition portion of each first cam surface engages the transition portion of a corresponding second cam surface, and the second ramp of each first cam surface engages the second ramp of a corresponding second cam surface in a sequential manner.

16. The apparatus according to claim 9 further comprising a cam spring for biasing the first cam member and the second cam member together.

17. The apparatus according to claim 8 wherein the drive coupling mechanism comprises:
   a coupling pawl coupled to the rotary member;
   a pawl biasing member for biasing the pawl toward a coupled position for coupling the rotary member for rotation with the drive member; and
   a pawl control member for retaining the coupling pawl in a decoupled position.

18. The apparatus according to claim 17 wherein the shift control mechanism is operated by a control cable having an inner wire disposed within an outer casing, and wherein the pawl control member comprises an outer casing coupler for coupling to the outer casing of the control cable.

19. The apparatus according to claim 17 wherein the shift control mechanism is operated by a control cable having an inner wire disposed within an outer casing, wherein the pawl control member comprises a first outer casing coupler for terminating a first portion of the outer casing of the control cable, and wherein the mounting member comprises a second outer casing coupler for terminating a second portion of the outer casing of the control cable.

20. The apparatus according to claim 19 wherein the mounting member slidingly supports the pawl control member for movement between a pawl engaging position, wherein the coupling pawl is held in the decoupled position, and a pawl disengaging position, wherein the coupling pawl is allowed to move toward the coupled position.

21. The apparatus according to claim 20 further comprising a pawl control member biasing member for biasing the pawl control member toward the pawl disengaging position.

22. A control apparatus for controlling a drive member rotatably supported on a bicycle comprising:
   a mounting member for mounting the apparatus to the bicycle;
   a rotary member rotatably supported to the mounting member;
   a first braking member;
   a first cam member coupled to the mounting member;
   a second cam member coupled to the rotary member for rotation therewith;
   wherein at least one of the first cam member and the second cam member moves the first braking member when the first cam member and the second cam member rotate relative to each other;
   a coupling pawl coupled to the rotary member;
   a pawl biasing member for biasing the coupling pawl toward a coupled position for coupling the rotary member for rotation with the drive member; and
   a pawl control member for retaining the coupling pawl in a decoupled position.

23. The apparatus according to claim 22 wherein the pawl control member is adapted to couple to a shift control mechanism so that the coupling pawl is allowed to move toward the coupled position upon actuation of the shift control mechanism.

24. The apparatus according to claim 23 wherein the mounting member slidingly supports the pawl control member for movement between a pawl engaging position, wherein the coupling pawl is held in the decoupled position, and a pawl disengaging position, wherein the coupling pawl is allowed to move toward the coupled position.

25. The apparatus according to claim 24 wherein the shift control mechanism is operated by a control cable having an inner wire disposed within an outer casing, wherein the pawl control member comprises a first outer casing coupler for terminating a first portion of the outer casing of the control cable, and wherein the mounting member comprises a second outer casing coupler for terminating a second portion of the outer casing of the control cable.

26. The apparatus according to claim 25 further comprising a pawl control member biasing member for biasing the pawl control member toward the pawl disengaging position.

27. The apparatus according to claim 26 further comprising a second braking member coupled to the rotary member for rotation therewith, wherein the first braking member is coupled to the mounting member, and wherein at least one of the first cam member and the second cam member cause the first braking member and the second braking member to frictionally contact each other when the first cam member and the second cam member rotate relative to each other.

28. The apparatus according to claim 27 wherein the first cam member includes a first cam surface, wherein the second cam member includes a second cam surface, wherein the first cam surface engages the second cam surface when the first cam member and the second cam member rotate relative to each other for moving the first cam member relative to the second cam member to cause the first braking member and the second braking member to frictionally contact each other.

29. The apparatus according to claim 28 wherein the first cam surface and the second cam surface cause the first cam member and the second cam member to move axially relative to each other when the first cam member and the second cam member rotate relative to each other.

30. The apparatus according to claim 29 wherein the first cam surface and the second cam surface are structured for causing the first cam member and the second cam member to reciprocate relative to each other in the axial direction when the first cam member and the second cam member rotate relative to each other.

31. The apparatus according to claim 30 wherein the first cam surface includes a first ramp extending in the axial direction toward the second cam member, a transition portion extending from the first ramp in a circumferential direction, and a second ramp extending from the transition portion away from the second cam member, and wherein the second cam surface includes a first ramp extending in the axial direction toward the first cam member, a transition portion extending from the first ramp in a circumferential direction, and a second ramp extending from the transition portion away from the first cam member.

32. The apparatus according to claim 31 wherein the first cam surface and the second cam surface are aligned such that, upon rotation of the first cam member and the second cam member relative to each other, the first ramp of the first cam surface engages the first ramp of the second cam surface, the transition portion of the first cam surface engages the transition portion of the second cam surface, and the second ramp of the first cam surface engages the second ramp of the second cam surface in a sequential manner.

33. The apparatus according to claim 32 further comprising:
   a plurality of the first braking members coupled to the mounting member; and
   a plurality of the second braking members coupled for rotation with the rotary member.

34. The apparatus according to claim 33 wherein the first cam member includes a plurality of the first cam surfaces disposed in a circumferential direction, and wherein the second cam member includes a plurality of the second cam surfaces disposed in a circumferential direction.

35. The apparatus according to claim 34 further comprising a cam spring for biasing the first cam member and the second cam member together.

* * * * *